US005995591A

United States Patent [19]

Halim

[11] Patent Number: 5,995,591

[45] Date of Patent: Nov. 30, 1999

[54] CONNECTING ARRANGEMENT FOR REDUCING INDUCED NOISE

[75] Inventor: Moe A. Halim, Ottawa, Canada

[73] Assignee: Nortel Networks Corporation, Montreal, Canada

[21] Appl. No.: 08/772,674

[22] Filed: Dec. 20, 1996

[30] Foreign Application Priority Data

Oct. 25, 1996 [CA] Canada .................................. 2188843

[51] Int. Cl.[6] ...................................................... H04M 9/00

[52] U.S. Cl. ......................... 379/55.1; 455/501; 455/557; 455/559; 439/941

[58] Field of Search ........................... 379/55.1; 455/501, 455/556, 557, 559, 63, 462, 465, 90, 575; 381/77; 439/676, 101, 941

[56] References Cited

U.S. PATENT DOCUMENTS

| | | | |
|---|---|---|---|
| 4,418,426 | 11/1983 | Singletary | 455/67.7 |
| 4,516,825 | 5/1985 | Brennan et al. | 439/607 |
| 4,658,096 | 4/1987 | West, Jr. et al. | 455/74.1 |
| 4,718,080 | 1/1988 | Serrano et al. | 455/74.1 |
| 4,737,975 | 4/1988 | Shafer | 455/557 |
| 4,775,997 | 10/1988 | West, Jr. et al. | 455/557 |
| 4,959,851 | 9/1990 | Tobolski, Jr. et al. | 455/74.1 |
| 5,117,450 | 5/1992 | Joglekar et al. | 455/557 |
| 5,127,041 | 6/1992 | O'Sullivan | 379/93.05 |
| 5,333,177 | 7/1994 | Braitberg et al. | 455/559 |
| 5,353,334 | 10/1994 | O'Sullivan | 455/557 |
| 5,483,576 | 1/1996 | Staples | 455/557 |
| 5,618,185 | 4/1997 | Aekins | 439/76.1 |

*Primary Examiner*—Dwayne D. Bost
*Assistant Examiner*—Tracy M. Legree
*Attorney, Agent, or Firm*—Jeffrey M. Measures

[57] ABSTRACT

A fixed wireless access subscriber unit extension telephone cable connecting arrangement is disclosed. The cable itself includes a single pair of wires for carrying the tip and ring signals between the subscriber unit and an extension telephone set. The cable also includes at least one additional wire, or pair of wires. This additional wire or pair of wires is connected to an effective ground, thus reducing the noise signal induced in the cable which is passed to the extension telephone set. This effective ground can be a node within the fixed wireless access subscriber unit which serves as the electrical common for the unit. In this case it is preferable to connect the additional wire, or pair of wires to the effective ground via a suitable capacitor or capacitors.

7 Claims, 3 Drawing Sheets

CONNECTING ARRANGEMENT FOR REDUCING INDUCED NOISE

FIELD OF THE INVENTION

The present invention applies generally to connecting arrangements wherein electromagnetic radiation in the vicinity of a connecting arrangement produce induced signals. In particular the present invention is well suited to fixed wireless access terminals wherein a cellular radio transceiver is connected to an extension telephone device.

BACKGROUND OF THE INVENTION

An interface device for connecting a cellular radio transceiver to a conventional telephony device is not new. For example, U.S. Pat. No. 4,658,096, naming West et al as inventors, describes an interface arrangement for connecting a conventional telephone set to a cellular transceiver such that the cellular network can provide telephony service to such a telephone set. This patent describes an interface which includes means for automatically determining when the user of such a telephone set has finished dialling, as the concept for connecting a telephone to a cellular transceiver was known in the "radio-patch" art. The above cited West patent is known in the art, and has been cited many times in subsequent patents dealing with further aspects of connecting a cellular transceiver to a telephony device.

There exists a known problem when such a telephony device is connected to a cellular transceiver. Typically an extension cable connects the cellular transceiver interface to the extension device. The part of the extension cable in the vicinity of the cellular transceiver will pick up modulated RF signal transmitted by the transceiver, producing an induced signal in the extension cable.

This induced signal will travel along the extension cable into the extension device where it be demodulated. The resulting demodulated signal will be heard as a background noise on the extension handset. This demodulated signal will also travel back into the cellular transceiver, wherein the signal will be heard as background noise if a handset is connected directly to the transceiver. Note that the RJ-11 port of the cellular transceiver can be fitted with an RF filter to prevent the induced RF from entering the transceiver directly. However the demodulated signal from the extension device will not be blocked by such an RF filter.

SUMMARY OF THE INVENTION

One aspect of the invention provides for the removal of an induced RF signal from a connecting arrangement before the induced signal can be demodulated by an extension telephone set or telephony device connected to the connecting arrangement. It should be noted that the invention can be applied generally to connecting arrangements which operate in the vicinity of a RF transmitter.

Typically, a connecting arrangement for connecting a telephony device to another device comprises a cable which includes a first pair of wires for carrying the tip and ring signals between the telephony devices (hereafter referred to as the "signal pair"). Typically the cable also includes additional pairs of wires, which allow for the future provision of a second telephone line, or carries DC power, or has other uses. According to one aspect of the invention the cable connecting one device to another includes at least one additional wire, or pair of wires in the vicinity of the signal pair, which is connected to an effective ground. An effective ground is a node within the device which provides a return path for currents which flow on the additional wire(s) without affecting voltages or currents in the signal path. This additional wire, or pair of wires serves to electromagnetically couple the signal pair of wires with the unused pair of wires such that a portion of the RF induced signal is extracted by the unused pair of wires and is then effectively grounded.

Thus, according to one aspect of the invention there is provided a connecting arrangement for connecting a single conductor or pair of conductors to a telephony device wherein said connecting arrangement includes means for connecting said conductors to said device and means for connecting additional conductors located in the vicinity of said first conductors to an effective ground.

Said effective ground can include conductor(s) physically connected to a physical ground. Alternatively, said effective ground can be an electrical "common" which acts as an antenna ground and also as the ground for the DC power supply and all additional circuitry in the absence of a physical ground.

According to another aspect of the invention there is provided a transceiver interface unit including a jack arrangement for connecting to a cable connected to a telephony device such that a first pair of wires carrying desired signals between the interface unit and the telephony device are connected to the interface unit and wherein an additional pair of wires within said extension cable are connected to an effective ground.

An advantage of the present invention is that existing telephones, with no RF filtering can be connected, by means of existing extension cables to such a transceiver unit without requiring any modifications to either the telephone or the extension cable. Thus the present invention provides improved sound quality for a low cost.

Therefore, according to an aspect of the invention there is provided a transceiver interface unit for communicating with a device via a cable, said cable including a first pair of wires for conducting desired signals between said interface unit and said device and at least one additional wire, said transceiver interface unit comprising circuitry for communicating with said device; and a cable connector for connecting to said cable, said cable connector comprising a first pair of connectors for connecting said first pair of wires with said circuitry; and a ground connector for connecting said at least one additional wire to an effective ground.

Therefore, according to an aspect of the invention there is provided an improved connecting arrangement for transmitting desired signals in the presence of electromagnetic radiation, said connecting arrangement comprising a cable comprising a first pair of wires for conducting the desired signal from a first device to a second device; and at least one additional wire; a first connector for connecting said cable to said first device, said first connector comprising a first pair of connections for connecting said first pair of wires to said first device; and a ground connection arrangement for effectively grounding said at least one additional wire; and a second connector for connecting said cable to said second device, said second connector comprising a second pair of connections for connecting said first pair of wires to said second device.

BRIEF DESCRIPTION OF THE DRAWINGS

The present invention, together with further objects and advantages thereof will be further understood from the following description of example embodiments with reference to the drawings in which.

DETAILED DESCRIPTION

Figure 1A:
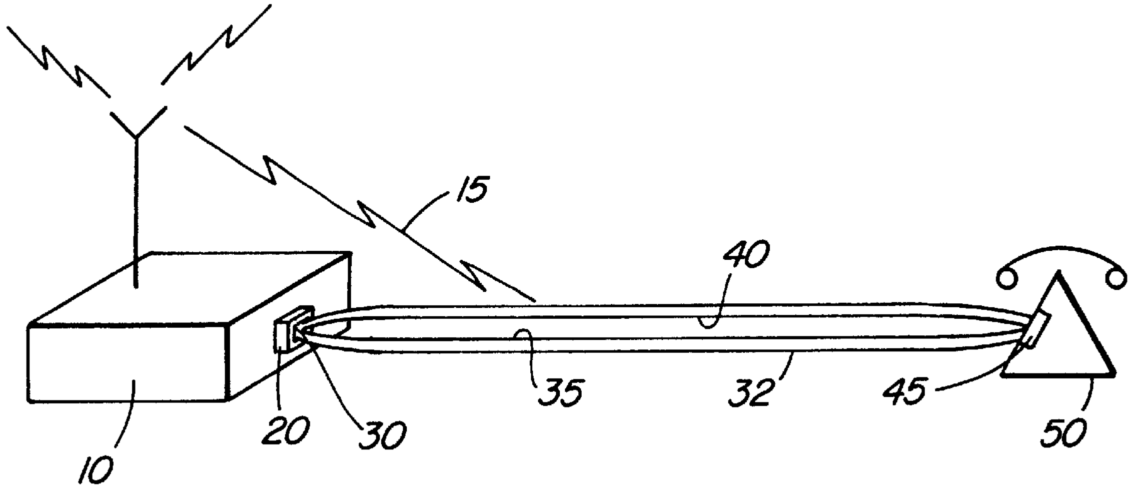
FIG. 1*a* is an illustration of a prior art arrangement, showing an extension device connected to a radio transceiver interface.
Figure 1B:
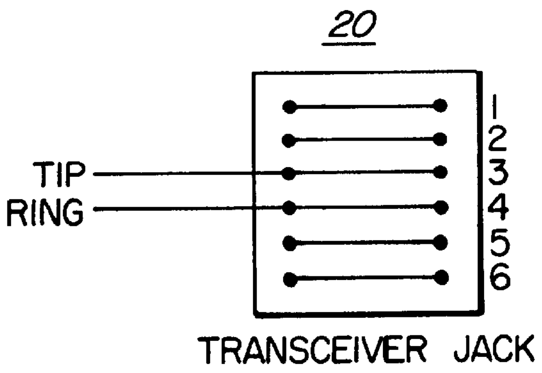
FIG. 1*b* is an illustration of the connections between the transceiver interface RJ-11 jack, and the extension cable of FIG. 1*a*.
Figure 1C:
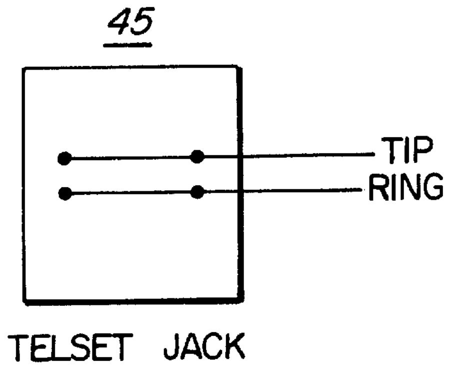
FIG. 1*c* is an illustration of the connections between the extension telephone RJ-11 jack, and the extension cable of FIG. 1*a*.

FIG. 1*a* illustrates a prior art arrangement for connecting a conventional telephone set 50 to a cellular transceiver interface unit 10. Interface unit 10 includes a transceiver, an interface arrangement, and a RJ-11 jack 20. Telephone cable 32 connects to RJ-11 jack 20. RJ-11 jack 20, shown in more detail in FIG. 1*b*, includes a pair of connectors (e.g., pins 3, 4) which connect to a pair of wires 35 and 40 within cable 32. These wires also connect to a suitable RJ-11 jack 45 in telephone set 50, shown in more detail in FIG. 1*c*. It should be noted that extension cable 32 often includes one or two additional pairs of wires, which allow for the future provision of a second telephone line, or carries DC power, or has other uses. Also, the RJ-11 jack typically includes up to six pins for connecting to the six wires in a three-pair extension cable. However, in the prior art arrangement shown in FIG. 1*a*, any additional pairs or wires in the cable 32 are typically unconnected, as only the pins 3 and 4 are connected to the audio circuitry, as shown in FIG. 1*b*.

When transceiver 10 is transmitting, RF radiation 15 is picked up by the wires 35 and 40 of cable 32, inducing a noise signal in the wires which is transmitted to the telephone set. This noise signal is demodulated in telephone set 50 producing background noise which is heard by a user. Furthermore, interface unit 10 can conveniently include a handset and suitable circuitry (not shown) for allowing a user to use the interface unit 10 as a wireless terminal. In this case the demodulated noise signal, which travels back from the extension set 50 along wires 35 and 40, will be heard by a user of the interface unit's handset as well.

Figure 2A:
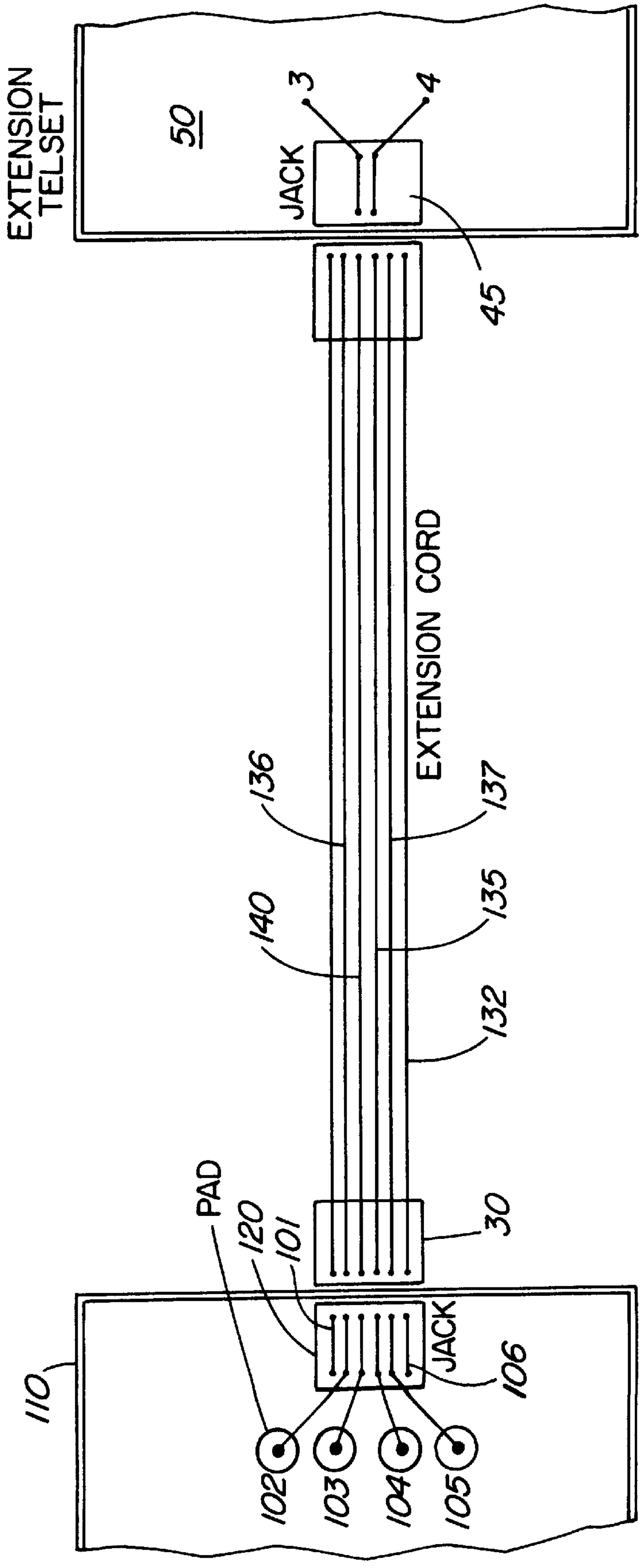
FIG. 2*a* is an illustration of a connecting arrangement according to one embodiment of the invention.

A preferred embodiment to the present invention will now be discussed with reference to FIG. 2*a*. In FIG. 2*a*, an extension cable 132 connects a transceiver interface unit 110 to an extension telephone set 50. In this embodiment, transceiver interface unit 110 includes a jack arrangement which includes a cable connector, e.g., a conventional RJ-11 jack 120, and a series of connectors or pads 102, 103, 104 and 105. Extension cable 132 in this example includes a first pair of wires 135 and 140 as well as an additional pair of wires 136 and 137. Wires 135 and 140 are connected to tip and ring terminals 103 and 104 which provide the tip and ring signals to the extension telephone set 50. In addition, jack 120 connects the additional pair of wires 136 and 137 to pads 102 and 105. These pads connect wires 136 and 137 to an effective ground. In this example, when extension cable 132 is located within the vicinity of RF radiation 15, an RF signal is induced in the wires. The induced signal in wires 136 and 137 are then carried to the pads 102 and 105 to be effectively grounded, thus providing a low impedance return path for induced signals. Therefore, as wires 136 and 137 provide a low impedance return path, a portion of the induced signal in wires 135 and 140 is electromagnetically coupled into the additional pair of wires 136 and 137. This portion of the induced RF signal is therefore effectively extracted from wires 135 and 140. This reduces the amount of RF interference transmitted along wires 140 and 135 to the extension telephone set 50.

As stated, pads 102 and 105 connect wires 136 and 137 to an effective ground. This can be done by connecting pads 102 and 105 to an actual electrical ground (e.g., the electrical ground provided by a three-plug "mains" power supply or a waterpipe). Alternatively, an electrical common used by all of the other components of the transceiver interface unit 110 (e.g. a common circuit board ground) can be used as an effective ground.

Figure 2B:
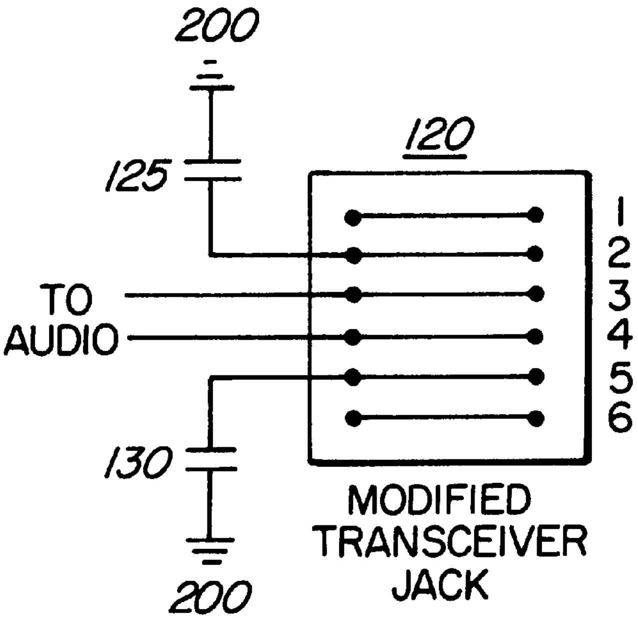
FIG. 2*b* is an illustration of the connections between the transceiver interface RJ-11 jack, and the extension cable of FIG. 2*a*.

Preferably, pads 102 and 105 connect the additional wires 136 and 137 to such an electrical common 200 via capacitors 125 and 130 respectively, as shown in FIG. 2*b*. This has the advantage of effectively grounding those two wires at RF frequencies while providing a high impedance at normal telephony frequencies. For example, capacitors 125 and 130 protects the common circuit board ground from dc voltages which result from exposing the circuit board common to ringing voltage from the wireline network, for example, by connecting the unit to a two-line extension telephone which is in turn connected to the wireline network.

The type of capacitors selected will depend on such factors as the RF frequency broadcast by the transceiver interface unit 10, and also by any expected DC voltage which can be anticipated. According to one embodiment, where the RF frequency is 400 Mhz, and the maximum expected DC voltage is 300V, then a suitable value for the capacitors 125 and 130 is 120 pF rated at 500V.

Although the "ground" connections are built into the transceiver interface unit 110 in FIG. 2, a person skilled in the art should note that a suitable adapter arrangement can be used to connect a conventional RJ-11 jack connection to the cable 132, wherein the adapter has pins connecting wires 136 and 137 to an effective ground, and connecting wires 135 and 140 to the pins 3 and 4 of the RJ-11 jack.

It should be noted that pins 101 and 106 of the RJ-11 jack on the transceiver unit 110 are not connected. Therefore the third pair of wires 138, 139 within cable 132 are not connected in FIG. 2*a* (assuming cable 132 is three pair, rather than a two pair cable, which would also suffice for the above). As an alternative arrangement, if a second line is desired, then this third pair could be used for that purpose. In that case, wire 136 of the second pair would electromagnetically couple away the interfering induced RF signals from both wires 138 and 140 of the third pair and first pair respectively. Similarly, wire 137 of the second pair would electromagnetically couple away the interfering induced RF signals from both wires 135 and 137 from the first and third pairs respectively. In some circumstances, additional pairs of wires are used for data. A single pair of wires can be used to ground the RF interfering signals in all of the pairs of wires used for transmission. Alternatively, cable 132 can be configured so that every signal carrying wire has an adjacent grounding wire.

Figure 3:
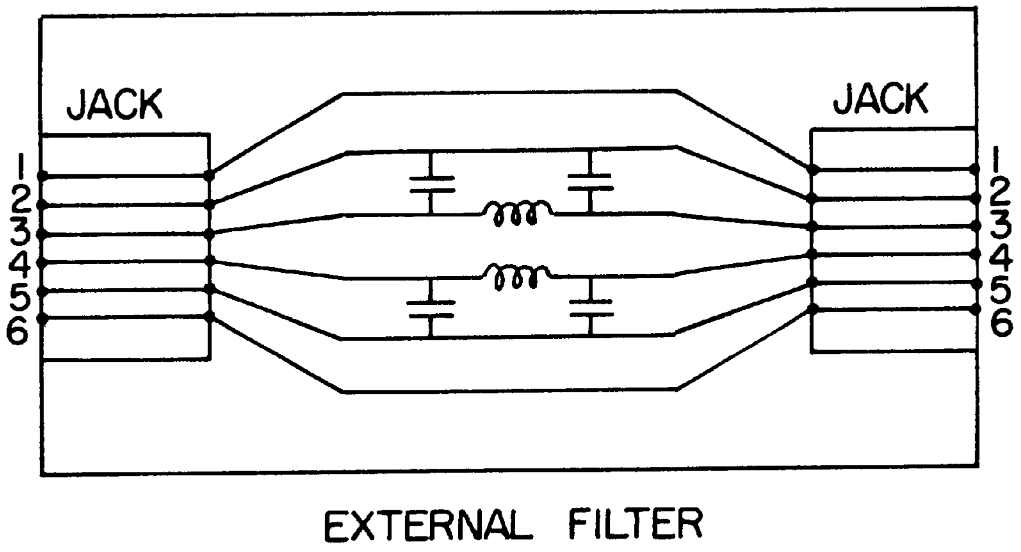
FIG. 3 is an illustration of an optional external filter which can be utilized with the arrangement shown in FIG. 2, according to one embodiment of the invention.

To further reduce the amount of induced noise which enters the extension telephony device, an optional RF filter can be used. Such a filter can be either incorporated into the connecting arrangement (e.g., built directly into the extension cable), incorporated within an adapter located between the extension cable and one of the devices, or incorporated between two lengths of extension cable. An example of such a filter is shown in FIG. 3. Such a filter includes a pair of low pass filters, one between wires 140 and 136, the other between wires 135 and 137. The low pass filters should pass voice/data frequency signals, but block RF frequency signals.

Numerous modifications, variations and adaptations may be made to the particular embodiments of the invention described above without departing from the scope of the invention, which is defined in the claims.

We claim:

1. A transceiver interface unit for communicating with a device via a cable, said cable including a first pair of wires for conducting desired signals between said interface unit and said device and at least one additional wire, said transceiver interface unit comprising:

- an effective ground comprising an electrical common or a ground connection;
- circuitry for communicating with said device; and
- a cable connector for connecting to said cable, said cable connector comprising:
  - a first pair of connectors for connecting said first pair of wires with said circuitry; and
  - a ground connector for connecting said at least one additional wire to said effective ground, wherein said ground connector comprises a capacitor coupling said at least one additional wire to said effective ground.

2. A transceiver interface unit for communicating with a device via a cable, said cable including a first pair of wires for conducting desired signals between said interface unit and said device and at least one additional wire, said transceiver interface unit comprising:

- an effective ground comprising an electrical common or a ground connection;
- circuitry for communicating with said device; and
- a cable connector for connecting to said cable, said cable connector comprising:
  - a first pair of connectors for connecting said first pair of wires with said circuitry; and
  - a ground connector for connecting said at least one additional wire to said effective ground, wherein said ground connector comprises a capacitor coupling said at least one additional wire to said effective ground, wherein said at least one additional wire comprises a pair of wires and wherein said ground connector comprises a capacitor for each wire of said pair of wires, said capacitor adapted to ground each wire at RF frequencies while providing a high impedance at normal telephony frequencies.

3. A transceiver interface unit as claimed in claim 2, wherein said cable connector also comprises a RF filter.

4. An improved connecting arrangement for transmitting desired signals in the presence of electromagnetic radiation, said connecting arrangement comprising:

- a cable comprising:
  - a first pair of wires for conducting the desired signal from a first device to a second device;
  - at least one additional wire; and
  - a RF filter;
- a first connector for connecting said cable to said first device, said first connector comprising:
  - a first pair of connections for connecting said first pair of wires to said first device; and
  - a ground connection arrangement for effectively grounding said at least one additional wire; and
- a second connector for connecting said cable to said second device, said second connector comprising a second pair of connections for connecting said first pair of wires to said second device.

5. An improved connecting arrangement for transmitting desired signals in the presence of electromagnetic radiation, said connecting arrangement comprising:

- a cable comprising:
  - a first pair of wires for conducting the desired signal from a first device to a second device;
  - at least one additional wire; and
  - a RF filter;
- a first connector for connecting said cable to said first device, said first connector comprising:
  - a first pair of connections for connecting said first pair of wires to said first device; and
  - a ground connection arrangement for effectively grounding said at least one additional wire; and
- a second connector for connecting said cable to said second device, said second connector comprising a second pair of connections for connecting said first pair of wires to said second device, wherein said at least one additional wire comprises a pair of wires and wherein said ground connection arrangement comprises a capacitor for each wire of said pair of wires, said capacitor adapted to ground each wire at RF frequencies while providing a high impedance at normal telephony frequencies.

6. A transceiver interface unit for communicating with a device via a cable, said cable including a first pair of wires for conducting desired signals between said interface unit and said device and at least one additional wire, said transceiver interface unit comprising:

- an effective ground comprising an electrical common or a ground connection;
- circuitry for communicating with said device; and
- a cable connector for connecting to said cable, said cable connector comprising:

a first pair of connectors for connecting said first pair of wires with said circuitry; and a ground connector for connecting said at least one additional wire to said effective ground, wherein said ground connector comprises a capacitor coupling said at least one additional wire to said effective ground, said capacitor selected to ground said at least one wire at RF frequencies while providing a high impedance at normal telephony frequencies.

7. An improved connecting arrangement for transmitting desired signals in the presence of electromagnetic radiation, said connecting arrangement comprising:

a cable comprising:

a first pair of wires for conducting the desired signal from a first device to a second device;

at least one additional pair of wires; and a RF filter;

a first connector for connecting said cable to said first device, said first connector comprising:

a first pair of connections for connecting said first pair of wires to said first device; and a ground connection arrangement for effectively grounding said at least one additional pair of wires; and a second connector for connecting said cable to said second device, said second connector comprising a second pair of connections for connecting said first pair of wires to said second device.

* * * * *